United States Patent [19]

Ledet et al.

[11] Patent Number: 5,170,883
[45] Date of Patent: * Dec. 15, 1992

[54] LAMINATED METAL SPROCKET FOR PLASTIC MODULAR CONVEYOR BELTS AND METHODS OF OPERATING BELT SYSTEMS

[75] Inventors: Brent A. Ledet, Kenner; James O. Gundlach, New Orleans, both of La.

[73] Assignee: The Laitram Corporation, New Orleans, La.

[*] Notice: The portion of the term of this patent subsequent to Dec. 24, 2008 has been disclaimed.

[21] Appl. No.: 774,353

[22] Filed: Oct. 10, 1991

Related U.S. Application Data

[63] Continuation-in-part of Ser. No. 529,511, May 29, 1990, Pat. No. 5,074,406.

[51] Int. Cl.$^5$ .............................................. B65G 23/06
[52] U.S. Cl. ..................................... 198/834; 474/157
[58] Field of Search ................. 198/834; 474/156, 157, 474/164

[56] References Cited

U.S. PATENT DOCUMENTS

| | | | |
|---|---|---|---|
| 1,201,748 | 10/1916 | Luce . | |
| 1,835,406 | 5/1922 | Kirsten . | |
| 3,674,130 | 7/1972 | Carmichael | 198/834 |
| 4,089,406 | 5/1978 | Teske et al. | 198/834 |
| 4,308,019 | 12/1981 | Horkey et al. . | |
| 4,729,469 | 3/1988 | Lapeyre et al. | 198/834 |
| 4,886,158 | 12/1989 | Lapeyre | 198/834 |
| 4,941,568 | 7/1990 | Lapeyre | 198/834 |
| 4,993,543 | 2/1991 | Lapeyre | 198/834 |
| 5,074,406 | 12/1991 | Gundlach et al. | 198/834 |

Primary Examiner—Joseph E. Valenza
Attorney, Agent, or Firm—Laurence R. Brown; James T. Cronvich

[57] ABSTRACT

A sprocket arrangement for driving conveyor belts is disclosed which provides improved operation in the presence of abrasives, corrosives and contaminants. The metal sprocket is used with modular plastic belts to produce long wear and improved performance. The sprocket is formed by aligning a multiplicity of thin substantially disk shaped metal sprocket lamina across the width of the belt. Groups of aligned lamina may be formed into a rigid sprocket unit by simply bolting or welding. Each of the sprocket lamina includes a non-circular central aperture for fitting onto a drive shaft. Driving surfaces are formed around the perimeter of each driving lamina. The lamina may be stacked in contact with each other, or for some applications may use spacers to separate selected ones of the stacked lamina so as to cooperate with the structure of the belt being driven.

7 Claims, 6 Drawing Sheets

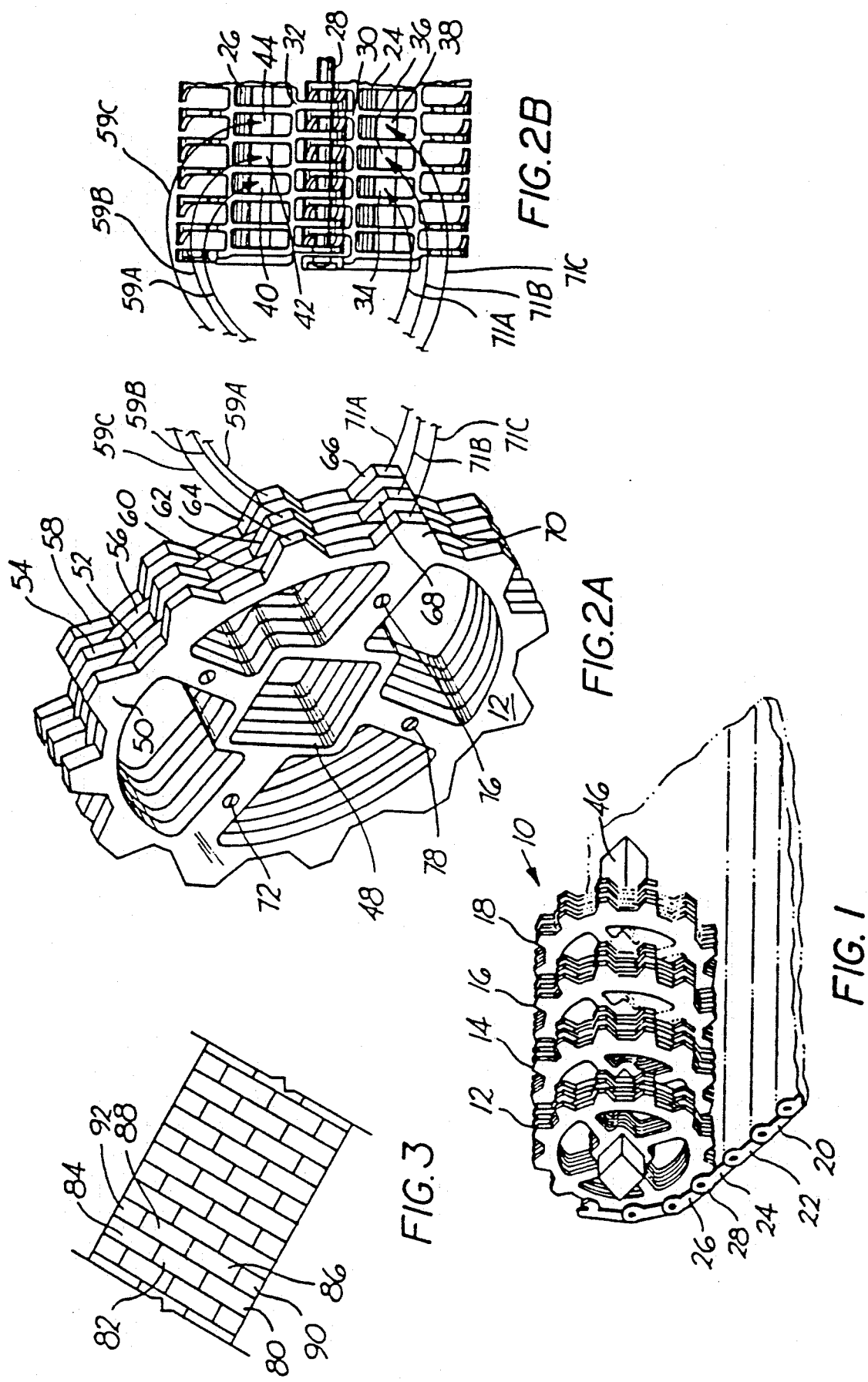

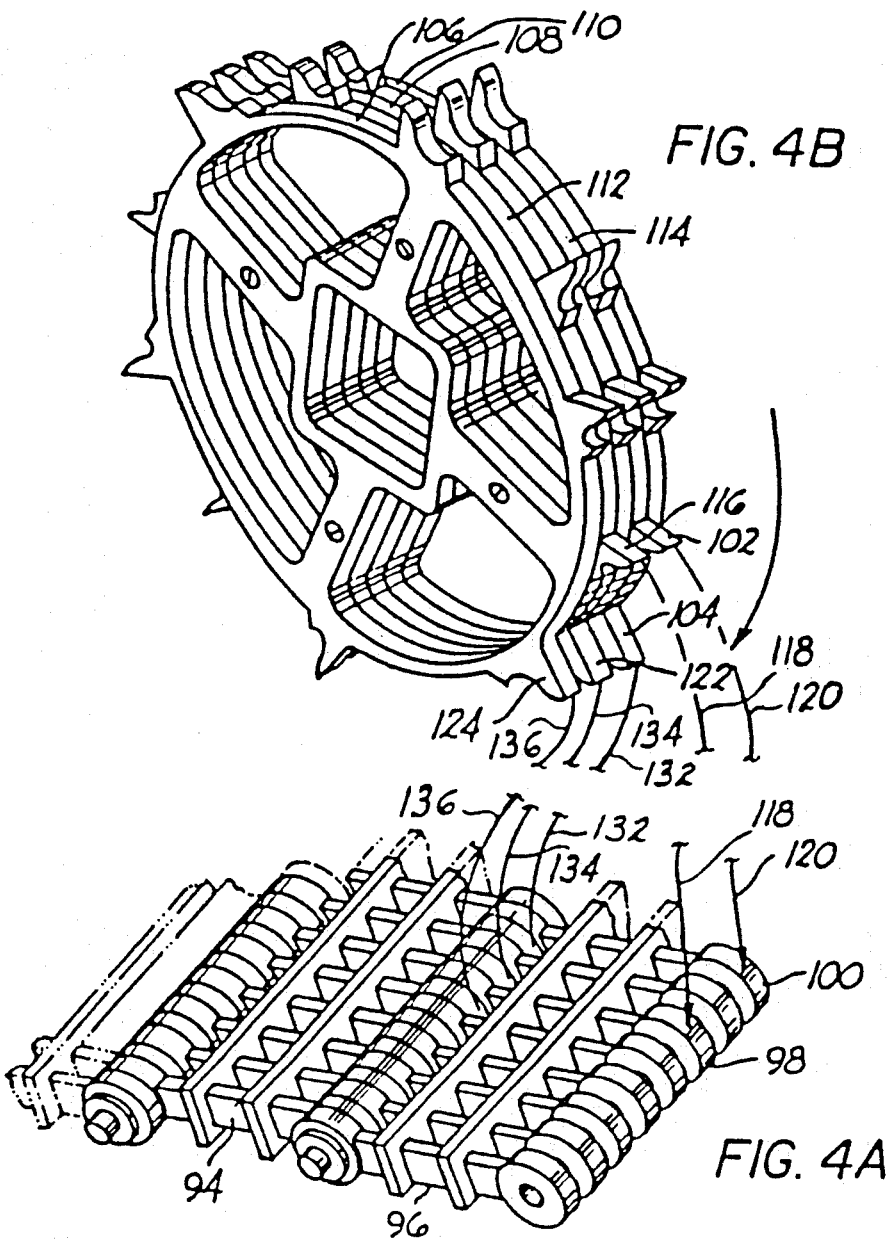
FIG. 4B
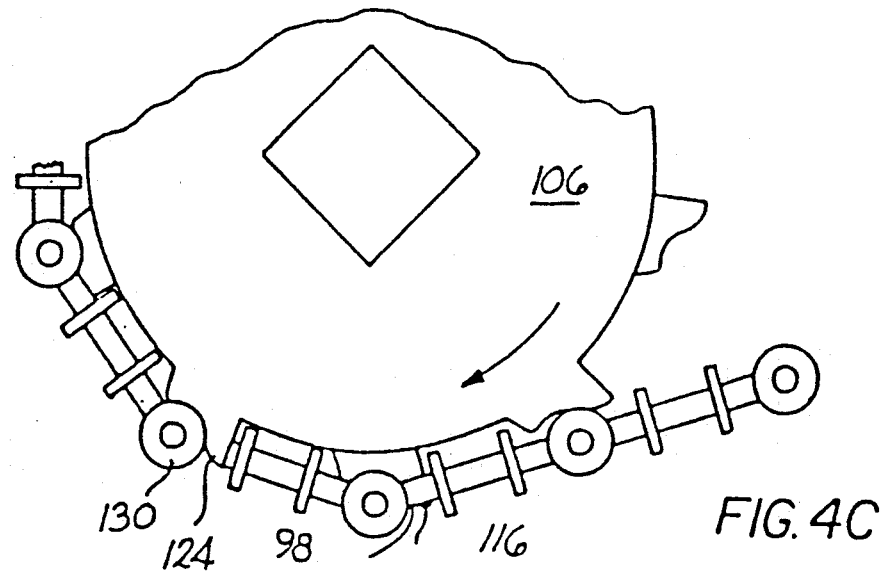
FIG. 4A
FIG. 4C

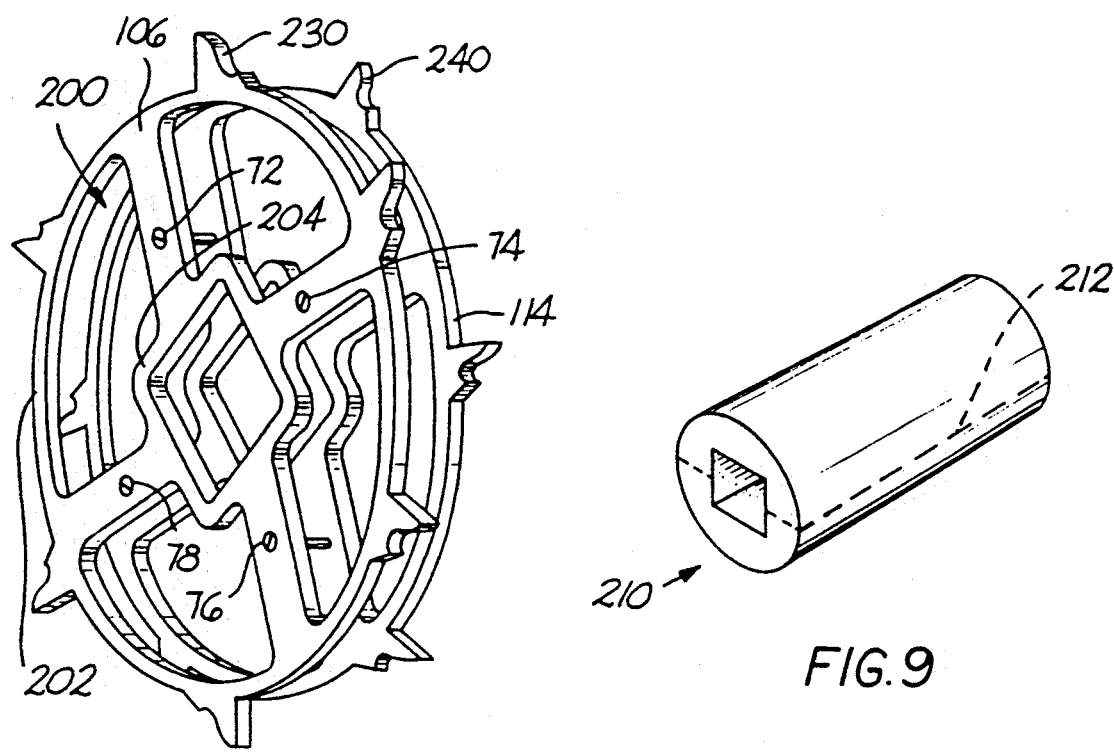
FIG. 8
FIG. 9
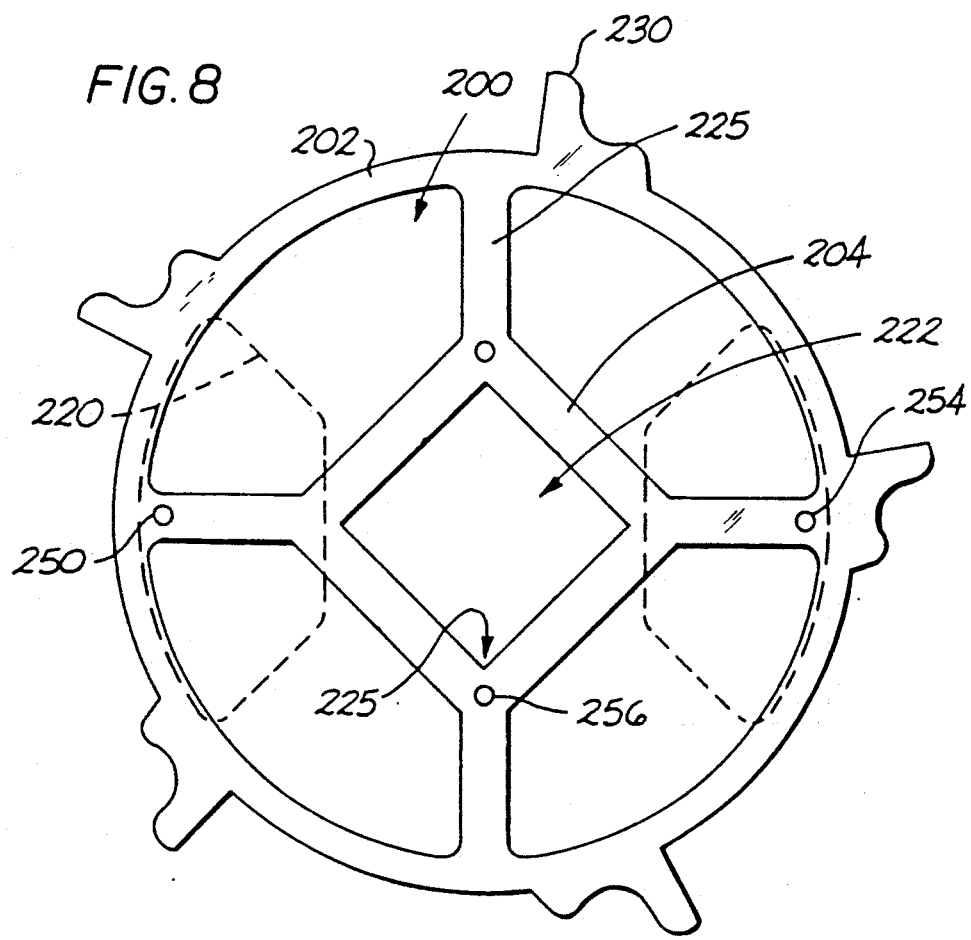
FIG. 10

LAMINATED METAL SPROCKET FOR PLASTIC MODULAR CONVEYOR BELTS AND METHODS OF OPERATING BELT SYSTEMS

This invention is a continuation-in-part application of our co-pending application 07/529,511 filed May 29, 1990 for Laminated Sprocket, now U.S. Pat. No. 5,074,406, issued Dec. 24, 1991 for Laminated Sprocket.

TECHNICAL FIELD

This invention relates to laminated sprockets for conveyor belts and more particularly it relates to plastic modular conveyor belt systems driven by laminated metal sprockets and methods of operating such systems in abrasive environments.

BACKGROUND

Laminated metal sprockets have been known in the U.S. patented art for driving metal chains or conveyors. Thus, T. C. Luce in U.S. Pat. No. 1,201,748, Oct. 17, 1916 for Sprocket Driving Device discloses a chain drive sprocket formed of three disc like sprocket laminations riveted together with paper sheets therebetween to reduce noise. Circumferentially extending sprocket teeth are staggered in such a way that alternating pairs of drive teeth are disposed on opposite sides of the sprocket.

K. F. J. Kirsten in U.S. Pat. No. 1,835,406, Dec. 8, 1931 for Power Transmitting Mechanism discloses a laminated metal sprocket driver for metal chain belts, wherein the laminations have openings to reduce the weight and material present in the sprocket. Different laminations are sandwiched with offset sprocket teeth, wherein the openings are also offset in such a way that the inner aperture surface of the sprocket is rough and uneven.

A metallic drag chain sprocket, shown in the E. J. Horkey, et al. U.S. Pat. No. 4,308,019, Dec. 29, 1981 for Drag Chain Sprocket is formed of spaced disc-like members welded coaxially along a cylindrical hub to support crossbar drive teeth. The discs are apertured to reduce weight and to form escape ports for abrasive material that might accumulate between the hub and the chain.

None of this prior art addresses the problems involved with driving plastic belts with metal sprocket teeth, particularly for operation in abrasive environment conditions or those which might tend to contaminate or erode the drive system. While some types of plastic to metal surfaces provide desirably low interface friction and good wear possibilities, this hybrid type of driving system creates significant problems when encountering abrasive conditions or contaminants that erode metal. It is therefore one objective of the invention to provide metal sprocket drives for plastic modular conveyor belts that overcome the presence of abrasives and resolve problems of working in sanitary conditions or with materials such as corrosives that tend to erode the metal. It is particularly necessary to provide conveyor belt systems that are suitable for use in sanitary environments, such as those dealing with sterile goods or foods.

Laminated sprocket drive systems have not heretofore been suitable for use in abrasive, corrosive or sanitary environments because of the existence of rough and hidden surface areas that cannot be sanitized and that tend to accumulate abrasives or corrosives that accelerate pitting and wear of metal parts to the extent that they accelerate wear and thus are not suitable for long life driving engagement with plastic modular belt drive surfaces.

It is therefore a general objective of the invention to improve the operation of conveyor belts and conveyor belt systems, particularly in abrasive, corrosive and sanitary environmental conditions.

A further objective of the invention is to correct the deficiencies of the prior art laminar sprocket drive systems such as those hereinbefore mentioned.

Further objects, features and advantages of the invention will be recognized throughout the following description, drawings and claims.

DISCLOSURE OF THE INVENTION

The sprocket provided by this invention has a plurality of metal sprocket lamina of predetermined thickness formed from a disc like member with a non-circular, for example square, drive aperture coaxially positioned about the axis of rotation of the sprocket. Peripherally oriented driving surfaces are spaced at selected angular positions around the axis of rotation, possibly at different radial distances from the axis of rotation to form a group of driving surfaces on each drive lamination. The laminations are formed from metal plates or sheet metal, preferably by laser cutting or stamping.

Each drive lamination preferably has cut thereinto an angularly positioned set of cut out apertures serving to reduce the weight and inertia of the system to better react to dynamic operating conditions. Of more importance however is the functioning of these cut out apertures to substantially improve performance of the modular plastic belt and metal sprocket drive system afforded by the invention, such as is more evident in the case of belts that operate in abrasive, corrosive or sanitary environmental conditions. Thus, when the lamina are stacked and aligned in a rigid structure, for example, the cut-out apertures are aligned in registration to produce a through tunnel or aperture with substantially smooth sidewalls extending therethrough in a direction parallel to the axis, so that the apertures can be seen and reached from the edges of the belt for cleaning and removal of residue including abrasives, corrosives or contaminants.

This permits the metal lamina, generally corrosion-resistant steel, to last longer without pitting so that the plastic belt to sprocket interface is less abrasive and life is lengthened. Also the sprocket lamina are not so readily weakened or defaced with corrosion and the belt drive system is superior in those installations where handling of food or special purity materials must be isolated from contaminating materials, such as bacteria, etc. The construction improves the prior art by providing access surfaces that do not have unreachable pockets, etc. for cleaning or rough sprocket surfaces that tend to accumulate abrasives and contaminants.

The sprocket lamina are useful in various embodiments and configurations formed across the width of modular plastic belts to provide mating drive surfaces, either as spaced single drive lamina or in rigid groupings. Spacer lamina or the like are used for producing rigid groupings, but are not necessitated. The stacked and aligned lamina of rigid groups may be bolted, welded or otherwise assembled with drive surfaces registered in various ways such as by alternating drive teeth in adjacent lamina.

Accordingly an improved long life, high performance drive system for a modular plastic belt of various widths is assured, particularly for operation in abrasive, corrosive or sanitary environmental conditions.

BRIEF DESCRIPTION OF THE DRAWINGS

The above features of the present invention will be more clearly understood from consideration of the following description in connection with the accompanying drawings in which:

FIG. 1 is a perspective view of a plastic modular conveyor belt cooperating with four sprockets formed of stacked and aligned lamina incorporating the features of this invention.

FIGS. 2A and 2B show an enlarged section of the belt and of the drive sprockets shown in FIG. 1.

FIG. 3 is a diagrammatic sketch showing how a typical belt used with the sprocket of this invention may be brick-layered to form a belt of any selected width.

FIGS. 4A and 4B are perspective views of a different embodiment of a belt and sprocket respectively incorporating the features of this invention. FIG. 4C is a side view of the belt and sprocket of FIGS. 4A and 4B in a drive relationship.

FIG. 8 is a perspective view of a sprocket embodiment of the invention.

FIG. 9 is a perspective view of a spacer assembly for positioning sprocket lamina across a conveyor belt width.

FIG. 10 is a plan view of a further sprocket lamination embodiment.

BEST KNOWN MODE FOR PRACTICING THIS INVENTION

Figure 5B:
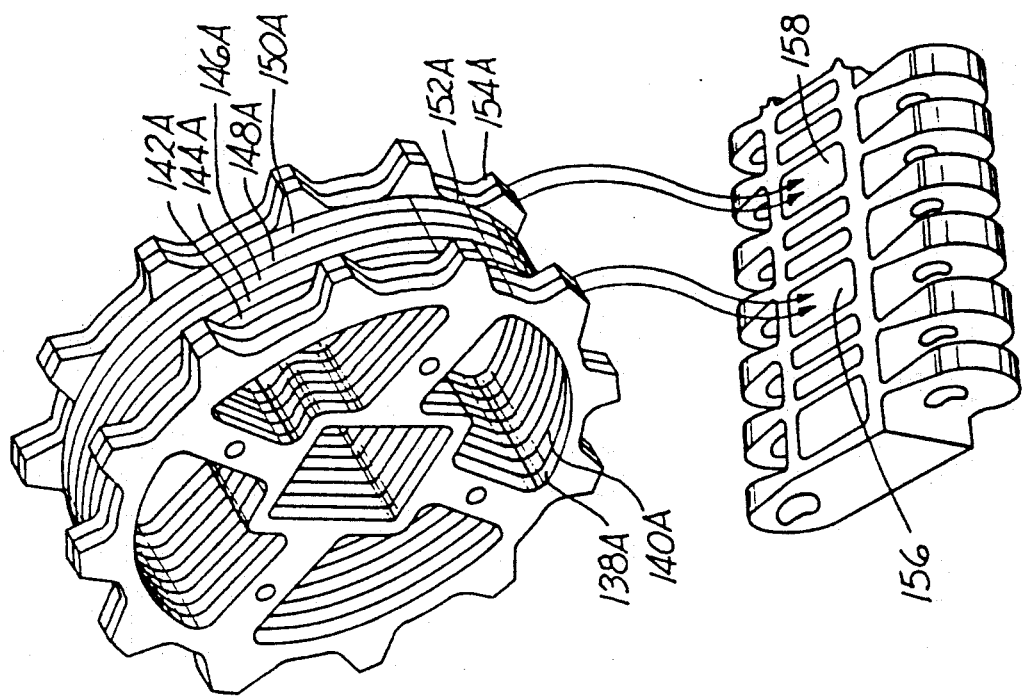
FIGS. 5A and 5B illustrate still another embodiment of a belt and two types of cooperating sprockets incorporating the features of this invention.

Referring now to FIGS. 1, 2 and 3 there is shown generally at 10 a section of a plastic modular conveyor belt cooperating with four sprockets 12, 14, 16, and 18 which incorporate the features of this invention. As shown in FIG. 1, a conveyor belt is formed of rows 20, 22, 24, and 26 of modules, each row including several full modules and/or full modules and portions of modules. As can better be seen in FIGS. 2A and 2B, which illustrate an enlarged view of sprocket 12 and a portion of the belt including rows 24 and 26. The rows are pivotally connected or joined by means of pivot rods such as pivot rod 28 which extends through apertures defined in the end of elongated link 30 of row 24 and link 32 of row 26. The rows 24 and 26 as shown in FIG. 2B are illustrated with numerous recesses for receiving sprocket teeth such as recesses 34, 36 and 38 of row 24 and recesses 40, 42, and 44 of row 26. The four sprockets 12, 14, 16, and 18 (shown in FIG. 1) are driven by a drive shaft 46 having a square cross-section, which is received by a square aperture in the sprockets such as aperture 48 shown in FIG. 2A.

Note that all of the lamina 50, 52, 54, 56 and 58 have their apertures in registration to provide tunnel like apertures axially oriented through the sprocket with substantially smooth walls. Thus, there are presented no rough or uneven surfaces that support retention or build-up of debris, abrasives or contamination such as bacteria. As seen from FIG. 1, the alignment of the apertures permits inspection and cleaning from the sides of the belt. Thus, for example a stream of cleaning fluid could be directed across the belt to remove any residue. This construction feature also resists corrosion such as might be encouraged if corrosives which attack metal lamina were entrapped and held in the sprocket structure. As a result, any abrasion or pitting of the metal sprocket such as on the face of the driving surfaces is retarded. Also, the lighter weight sprockets resulting from the cut-out portions 200 about the discs forming the outer and inner rims 202, 204 provide less weight and inertia for better performance when drives are started and stopped.

As shown, each of the sprockets is formed by five spaced and stacked lamina such as stacked lamina 50, 52, 54, 56 and 58, of which lamina 50, 54, and 58 include teeth or driving surfaces. Referring now to FIGS. 2A and 2B it can be seen that teeth 60, 62 and 64 of stacked lamina 50, 54, and 58 respectively mesh with recesses 40, 42, and 44 of rows 26 of the belt section as indicated by arrows 59A, 59B and 59C. In a similar manner, teeth 66, 68 and 70 mesh with recesses 34, 36 and 38 respectively of row 24 of the belt section as indicated by arrow 71A, 71B and 71C. Thus by using these thin lamina stacked together, the resultant sprockets provide increased driving surface area over a selected width of the belt. It will of course be appreciated that each sprocket structure could provide a number of tooth lamina different than three, and a larger number or lesser number of sprocket structures than four could be spaced along drive shaft 46 across the width of the belt.

The enlarged section of the belt 10 and sprocket 12 of FIGS. 2A and 2B better illustrate how a plurality of teeth across the width of the sprocket 12 cooperates with drive surfaces on the conveyor belt. However, it should be appreciated that a belt could be substantially wider and require significantly more than four sprockets and each sprocket could have a significantly larger number of teeth across the full width of the sprocket such as for example on the order of 20 or more teeth. Thus, fabrication of a sprocket by using preformed lamina in this manner is substantially easier than making a sprocket having a similar increased amount of contact or surface area from a single piece of material. It should further be noted that in the embodiment of FIGS. 1, 2A and 2B, there is also included toothless lamina or spacers such as the disk shaped spacers 52 and 56 located between the tooth lamina 50, 54, and 58. In this embodiment, it is noted that the thickness of the spacer or toothless lamina is slightly greater than the thickness of the elongated links 30, and 32 such that as aligned teeth are received by the sprocket recesses the elongated links will be located between the tooth sprocket lamina. It will of course be appreciated rather than having toothless lamina or disks used as spacers, any type of means for suitably spacing the lamina may be used, such as later described with reference to FIGS. 8 to 10. For example, in the embodiment of FIGS. 1, 2A and 2B, four bolts 72, 74, 76 and 78 are shown as holding the stacked and aligned lamina together. Therefore, it would be possible to simply use four washers having the proper thickness located on the bolts in between each of the toothed lamina to provide the spacing. It will also be appreciated, of course that the stacked toothed and toothless lamina could be held together by spot welding or other means rather than bolts 72, 74, 76 and 78.

It will be understood by those skilled in the art that conveyor belts are often required to be in all sizes of width and length, to accomplish various types of conveying needs. Consequently, it is highly desirable that the belting system be made of modules or units which can be placed together in an end-to-end and side-by-side relationship so as to form a belt of any suitable width or length.

FIG. 3 illustrates how belts made of modules of the types discussed above may be made of identical modules having a single width along with a few partial or half modules so as to form a belt three modules wide but which also has substantially the strength of a single module across the belt. The strength of the belt is achieved as a result of the intermeshing and interlocking of the pivot ends. As shown, the full length modules 80, 82, and 84 are simply laid side-by-side across the width of the belt. Each row on both sides of the row comprised of modules 80, 82 and 84 include two full size modules such as modules 86 and 88 and two partial modules such as 90 and 92. When this brick-layered pattern is continued for the length of the belt, the belt has substantially more strength across its width than it would without the brick-layering. However, it should be understood that whether or not the belt is brick-layered, or simply one module wide, (no matter how wide the module) the sprocket of this invention can be used to provide increased contact area of the driving surfaces.

Referring now to FIGS. 4A, 4B and 4C there is shown another type of belt module and a sprocket for cooperating with such a modular belt which incorporates the features of this invention. As shown in FIG. 4A, every other row, such as rows 94 and 96, of the belt is offset with respect to the previous row, and the belt is driven by sprocket teeth which contact the link ends such as link ends 98 and 100 rather than the center portion of the belt. Thus, as shown in FIG. 4B, it is necessary that every other sprocket tooth around the perimeter such as sprocket teeth 102 and 104 also be staggered such that each of the link ends may be in contact and driven by tooth. As can be seen therefore, there are two different types of lamina incorporated with each sprocket of this embodiment. The two types of lamina are substantially the same, except they are rotated with respect to their orientation to the drive or square aperture. Thus, lamina having reference numbers 106, 108 and 110 are of one type and lamina interspersed therebetween having reference numbers 112, and 114 are of the second type. In a preferred embodiment, again the thickness of the lamina is slightly greater than the same thickness of the elongated members or links of the conveyor belt. On the example shown in FIGS. 4A and 4B, it can be seen that teeth 102 and 116 contact and drive link ends 100 and 98 respectively, as is indicated by arrow 118 and 120, and in a similar manner, teeth 104, 122 and 124 drive link ends 126, 128 and 130 as indicated by arrow 132, 134, and 136 respectively. FIG. 4C is combination cross-sectional view showing the staggered teeth and how the belt is driven at its link ends rather than at the center of the module.

Figure 5A:
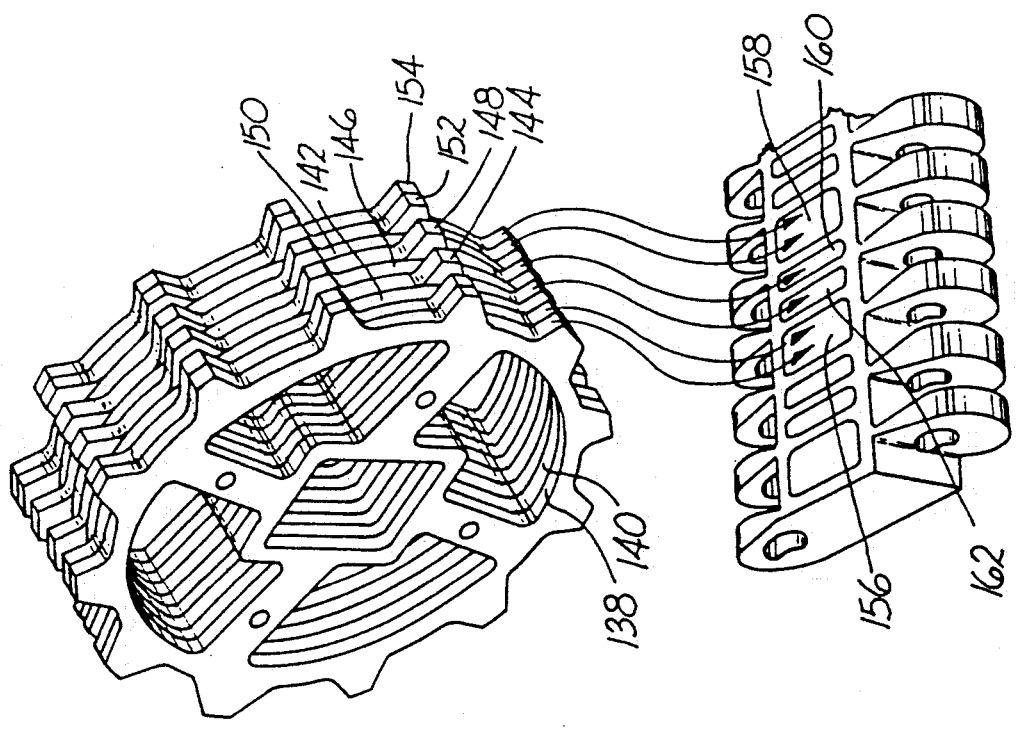

FIGS. 5A and 5B show still another type of belt and two types of cooperating sprockets which incorporate the teachings of this invention suitable for driving such a belt. According to FIG. 5A, it will be noted that there are two-toothed lamina 138 and 140, stacked next to each other followed by a toothless lamination or spacer 142, another toothed lamination 144, a spacer 146, another toothed lamination 148, a spacer 150, and then two more toothed lamina 152 and 154. Thus, there is one tooth that is two thicknesses wide and two teeth which are a single thickness wide followed by another tooth that is two thicknesses. This arrangement provides the maximum amount of driving surface that can be obtained with a belt of this type. FIG. 5B shows an alternate embodiment for driving the belt, but only uses two stacked lamina 138A and 140A followed by five spacers 142A, 144A, 146A, 148A and 150A and then two more stacked tooth lamina 152A and 154A. In this way, only the large driving recesses 156 and 158 will receive a driving tooth, whereas according to the embodiment of FIG. 5A the small recesses 160 and 162 also receive a single thickness driving tooth.

Figure 6:
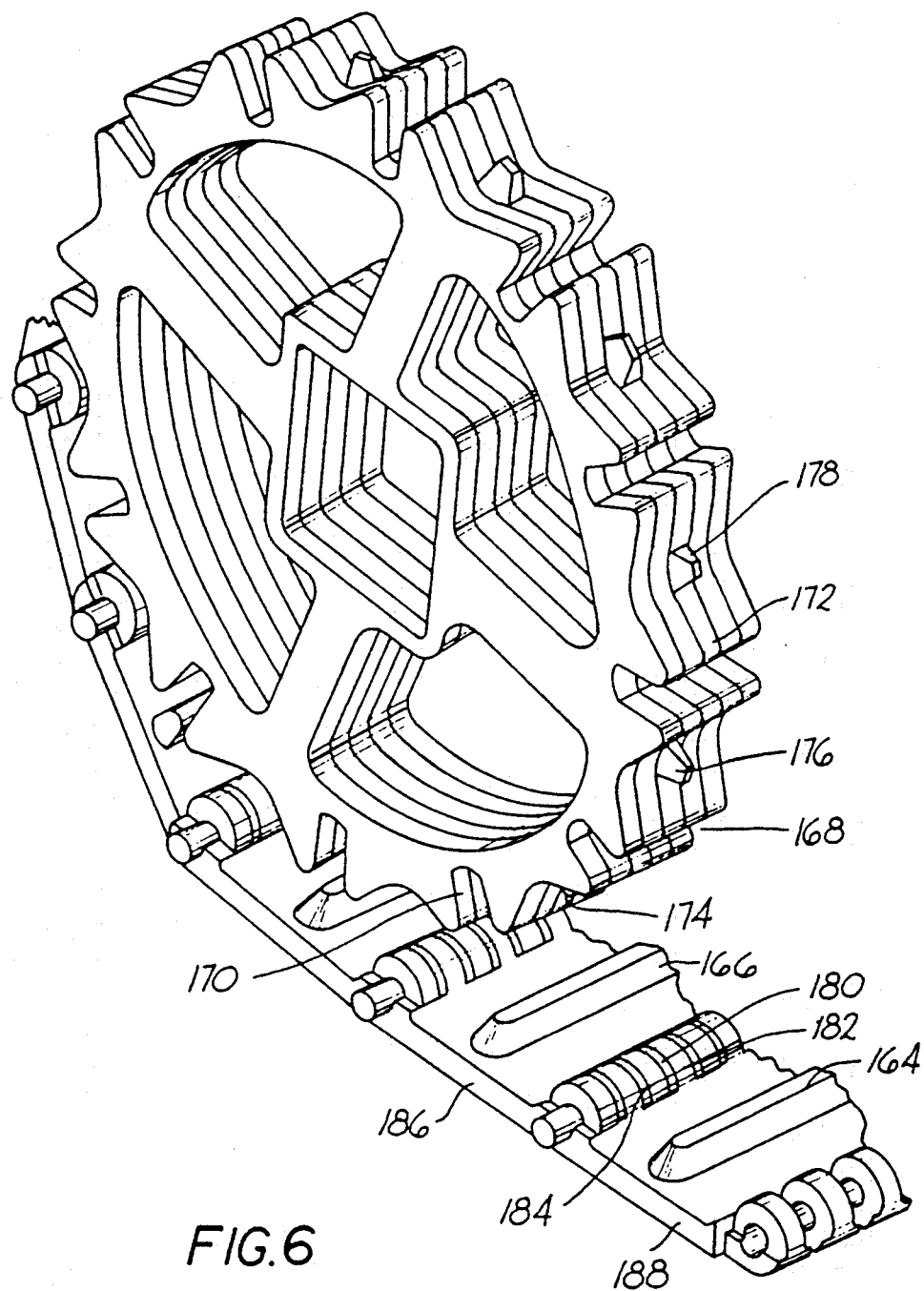
FIG. 6 shows still another embodiment of a conveyor belt and a cooperating sprocket incorporating the features of this invention.

Referring now to FIG. 6, there is shown still another type of belt suitable for being driven by a sprocket incorporating the features of this invention. As shown, the belt of this embodiment does not include driving recesses but instead include a single driving rib such as driving ribs 164 and 166 across the width of the belt and/or module. Consequently, to cooperate with the belt the sprocket includes recess driving surfaces such as recesses 168 and 170 which receive the driving cross-member of the belt. Further, as shown in this example, identical lamina are simply stacked together in as large a number as is desired to achieve the width of the sprocket desired. It should be noted however, that such a sprocket having only the driving recesses would not provide any tracking to the belt. Therefore, there is also provided on selected ones of the lamina, such as lamina 172, additional guide teeth such as guide teeth 174, 176 and 178 which are received by the spaces between the intermeshed link ends such as, for example, space 180 between link ends 182 and 184 of modules 186 and 188.

Figure 7:
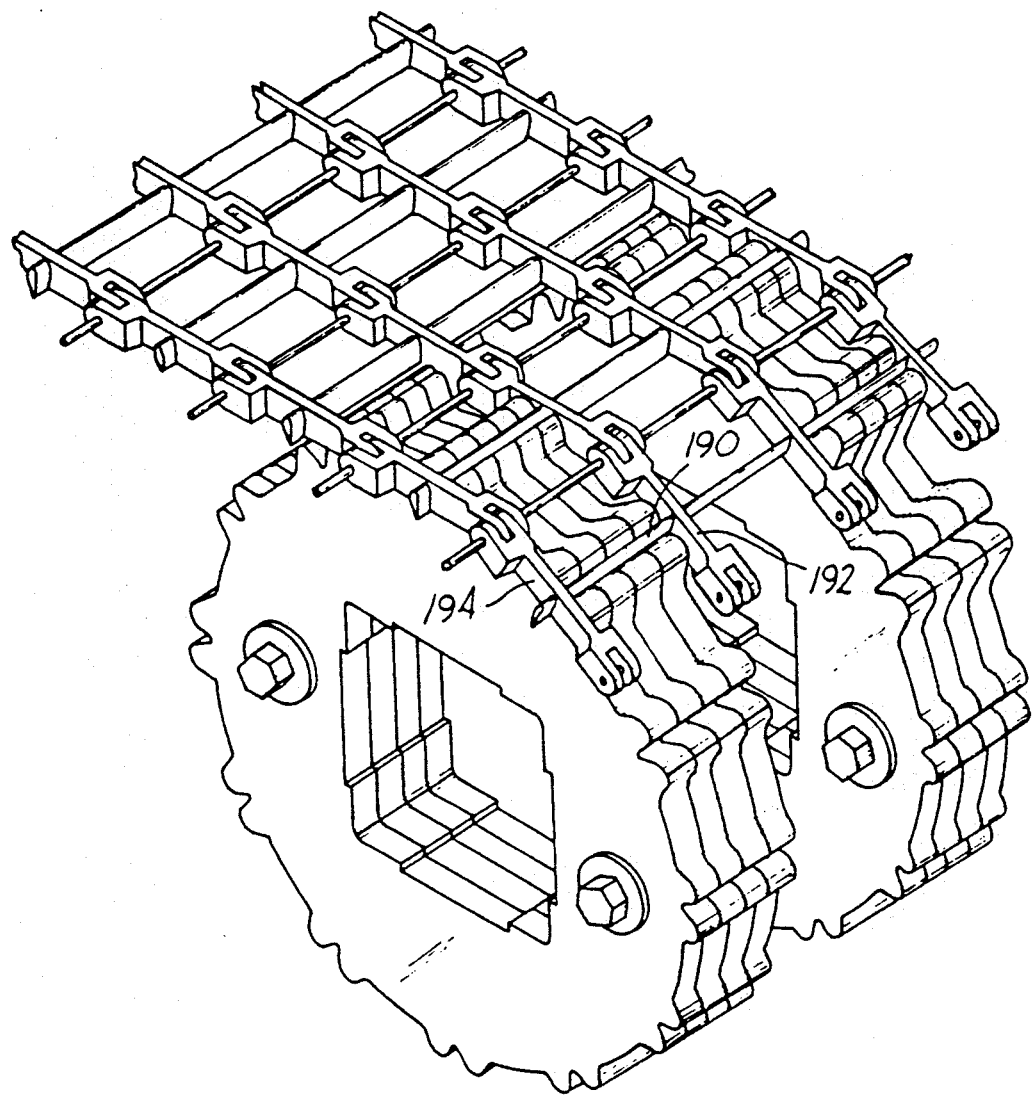
FIG. 7 is yet another embodiment of a conveyor belt and a cooperating sprocket incorporating the features of this invention.

Still another belt suitable for being driven by a laminated sprocket of this invention, as shown in FIG. 7, also includes a cross-member 190 (or group of cross-members) for receiving a driving force, but in this example, the cross-member 190 is located between the elongated support ribs 192 and 194 rather than a single cross-member across the bottom of the belt module. In this type of structure, it is again necessary to provide recesses in the lamina forming the sprocket.

Thus, although there has been described to this point particular embodiments of sprockets for use with different types of conveyor belts, each described sprocket incorporating stacked and aligned lamina securely joined together to form a rigid sprocket having at least two teeth of guiding areas across the width of the belt, it is not intended that such specific references be considered as limitations upon the scope of this invention. Some further embodiments now to be described are illustrative.

In the FIG. 8 sprocket the lamina 106 and 114 are spaced apart and held there during use by means of screws 72, 74, 76, 78. This assembly therefore is light weight and avoids any pockets or rough surfaces where abrasives, corrosives or contaminants tend to accumulate and makes all surfaces visible and easy to clean.

The primary reason for spacers between the drive lamina 106, 114, etc. is to locate them axially along the drive shaft for registration with belt driving surfaces. In some belt drive systems it is desirable to let some of the lamina float on the drive shaft to allow for belt expansion and contraction, etc. Thus, a temporary spacer 210, FIG. 9, which has separable halves defined at line 212, may be used for initial registration with a belt and removed. In such installations, the sprockets do not require stacked rigid laminar assemblies.

The advantages of the cut-out apertures 200, preferably formed by a laser cutting tool for example, include the ability to use the blanks 220 cut out from the initial sprocket discs as spacers, such as by welding in place on one or both sides of the sprocket drive lamina as sugested by the dotted lines in FIG. 10. In this embodiment, the rim 204 about the substantially square drive apertures 222 is coupled to the circumferential rim 202 by means of radial coupling links 225 extending from the four apices 228 of the square. This produces cut-out apertures 200 and corresponding blanks 220 of substantially trapezoidal shape, thus even further improving the contour of the apertures so that accumulation of contaminants is discouraged. Furthermore this lamination configuration provides the advantage of offsetting the drive surfaces 230, 240 of adjacent drive lamina, as shown in FIG. 8, with a single lamination. This is achieved by simply reversing the lamina to register at the bolt apertures 250, 252, 254, 256.

This invention therefore has contributed an improved method of operating a plastic modular conveyer belt system having a plurality of belt drive surfaces disposed across a predetermined width of the belt by employing metal drive sprocket lamina. Thus metal sprocket drive lamina of predetermined thickness are produced from metal discs by removing a set of apertures of predetermined shape from the discs to form a lighter weight skeleton embodiment of the sprocket. A plurality of such metal drive lamina defining a non circular drive aperture about an axis of rotation and presenting a plurality of driving surfaces radially disposed about the laminations are disposed across the width of the belt while the laminations are retained in a spaced relationship to register the metal driving surfaces of the lamina with the plastic belt drive surfaces in a driving relationship. The apertures of the plurality of lamina are aligned and disposed across the width of the belt in registration to provide surfaces that do not accumulate contamination, which are easily accessible from belt sides for cleaning and viewing and which provide superior dynamic performance with light weight metal sprocket features. In some embodiments the lamina are joined in a rigid structure with through apertures having substantially smooth walls that are not substantially susceptible of retaining residue from operation of the belt and that are disposed for avoiding entrapment of any such residue in positions where cleaning would be difficult.

Having therefore improved the state of the art with novel laminar sprockets and belt systems with corresponding methods of operation, wherein modular plastic belts are driven with metal sprocket lamina, those features of novelty suggestive of the spirit and nature of the invention are defined with particularity in the following claims:

We claim:

1. A plastic modular conveyer belt driving system, comprising in combination, a drive sprocket having sprocket and belt driving surfaces thereon adapted to rotate about a sprocket axis, said plastic conveyor belt being of predetermined width across which are disposed a plurality of spaced mating belt driving surfaces for engagement by said drive sprocket belt driving surfaces wherein the sprocket belt driving surfaces engage in mating contact a plurality of the belt driving surfaces, said drive sprocket being formed of a plurality of metal sprocket driving lamina of predetermined constant thickness at least some of which have a drive axis of rotation about which is formed a non-circular sprocket drive aperture and a plurality of the sprocket belt driving surfaces disposed at selected angular positions about the axis of rotation, and means comprising spacers of at least the thickness of the driving lamina between adjacent ones of at least two said driving lamina and being configured with peripheral surfaces avoiding contact with the plastic belt to serve the function of separating driving lamina from each other at predetermined distances to register the lamina belt driving surfaces for engagement with the mating belt driving surfaces at spaced positions across the belt.

2. The driving system of claim 1 wherein said drive sprocket further comprises a plurality of single driving lamina spaced from each other by said spacers in a direction across the width of said belt.

3. The driving system of claim 1 wherein the driving lamina comprise substantially circular disks defining a plurality of radially disposed cut out aperture positions located at angularly spaced positions about the disks.

4. The driving system of claim 3 wherein a plurality of said driving lamina are joined into a rigid structure having the apertures aligned in registration to from a substantially unobstructed continuous passage extending through the sprocket which passage is accessible for cleaning from the edges of the belt, the passage further having smooth surfaces registered to avoid pockets that tend to accumulate and retain residue from operation of the belt.

5. The driving system of claim 3 wherein the disks comprise a configuration wherein the non-circular drive aperture is substantially square, the radially disposed aperture positions are of substantially trapezoidal shape and a circumferential rim about the disks is connected by radial coupling links to four positions extending from a substantially square rim about said drive aperture.

6. A conveyor belt system comprising in combination, a plastic conveyor belt with belt drive surfaces spaced across a predetermined width of the conveyor belt, a plurality of metal belt driving lamina of substantially constant thickness metal, each having a set of sprocket drive surfaces and a plurality of cut out aperture locations in the lamina, both said drive surfaces and said aperture locations being radially arranged about an axis of rotation within a non-circular sprocket drive aperture defined in the center of each lamina, a rotary drive shaft for mating into the central apertures of the lamina in a driving relationship, at least one spacer member of greater thickness than said driving lamina configured to avoid contact with said belt, and a sprocket drive assembly with said drive shaft having disposed thereon said plurality of metal belt driving lamina with sprocket drive surfaces positioned for mating with the belt drive surfaces, at least some of said driving lamina being spaced from each other on the drive shaft by said spacer member to register the sprocket drive surfaces with corresponding belt drive surfaces across the width of the belt.

7. The conveyor belt system of claim 6 further comprising,
a rigid sprocket drive assembly having said spacer member separating a plurality of said driving lamina from each other on the drive shaft in a fixed spacing relationship, said spacer means being at least as thick as the sprocket lamina.

* * * * *